US008655742B2

(12) United States Patent
Cheng et al.

(10) Patent No.: US 8,655,742 B2
(45) Date of Patent: Feb. 18, 2014

(54) SYSTEM AND METHOD FOR DETERMINING ORDER FULFILLMENT ALTERNATIVE WITH MULTIPLE SUPPLY MODES

(75) Inventors: Feng Cheng, Chappaqua, NY (US); Young Min Lee, Old Westbury, NY (US)

(73) Assignee: International Business Machines Corporation, Armonk, NY (US)

( * ) Notice: Subject to any disclaimer, the term of this patent is extended or adjusted under 35 U.S.C. 154(b) by 1134 days.

(21) Appl. No.: 12/051,697

(22) Filed: Mar. 19, 2008

(65) Prior Publication Data

US 2009/0240544 A1    Sep. 24, 2009

(51) Int. Cl.
*G06Q 30/00*        (2012.01)

(52) U.S. Cl.
USPC ............................. 705/26.2; 705/7.12

(58) Field of Classification Search
USPC ............... 604/20; 705/8, 17, 28, 16, 26, 26.2; 235/379, 380
See application file for complete search history.

(56) References Cited

U.S. PATENT DOCUMENTS

| 5,953,707 | A * | 9/1999 | Huang et al. ................ 705/7.25 |
| 8,209,242 | B1 * | 6/2012 | Henderson et al. ............. 705/28 |
| 2002/0043669 | A1 * | 4/2002 | Kobayashi et al. ............ 257/207 |
| 2005/0075952 | A1 * | 4/2005 | Zhang et al. .................... 705/28 |
| 2006/0069598 | A1 * | 3/2006 | Schweitzer et al. .............. 705/8 |

FOREIGN PATENT DOCUMENTS

EP    770967 A2 *   5/1997

OTHER PUBLICATIONS

John T Blake, Michael W Carter, A goal programming approach to strategic resource allocation in acute care hospitals, European Journal of Operational Research. Amsterdam: Aug. 1, 2002. vol. 140, Iss. 3; p. 541.*
S. P. Sethi et al., Peeling Layers of an Onion: Inventory Model with Multiple Delivery Modes and Forecast Updates, Journal of Optimization Theory and Applications, Feb. 2001, pp. 253-281, vol. 108, No. 2.
V. L. Zhang, Ordering Policies for an Inventory System with Three Supply Modes, Naval Research Logistics, 1996, pp. 691-708, vol. 43, No. 5.
Alan Scheller-Wolf et al., A Markovian Dual-Source Production-Inventory Model with Order Bands, GSIA, Carnegie Mellon University, Mar. 2, 1998, GSIA Working Paper No. 1998-E200, Pittsburgh, PA.

* cited by examiner

*Primary Examiner* — Matthew Gart
*Assistant Examiner* — Rokib Masud
(74) *Attorney, Agent, or Firm* — Scully, Scott, Murphy & Presser, P.C.; Daniel P. Morris, Esq.

(57) ABSTRACT

A system and method for optimizing order fulfillment by considering multiple supply modes in one aspect, plans supply of inventory by forecasting demand, estimating accuracy of said forecasted demand, and establishing reorder point policy based at least on said accuracy of said forecasted demand and a plurality of supply transportation modes. Current inventory position is monitored and if the current inventory position is below the reorder point policy, orders are placed according to a selected shipping method. The selected shipping method may be based at least on customer order priority and transportation budget.

20 Claims, 3 Drawing Sheets

SYSTEM AND METHOD FOR DETERMINING ORDER FULFILLMENT ALTERNATIVE WITH MULTIPLE SUPPLY MODES

FIELD OF THE INVENTION

The present application generally relates to optimization, and more particularly to a system and method for determining order fulfillment alternatives with multiple supply modes.

BACKGROUND OF THE INVENTION

When a customer order is received at a facility such as distribution center, assembly center, or any other business that may receive orders, there are several ways of fulfilling the order. One method is to fulfill directly from the inventory of products or components or like, provided that sufficient inventory exists. In situations where there is not enough inventory to fulfill the order at the site that receives the order, the supply of items has to be shipped from another location, typically the supplier, to the fulfillment facility. For this situation, there can be more than one way of transporting the supply from the supplier to the fulfillment center (for example, distribution center). For instance, the goods may be shipped by premium air, ocean transportation, ground transportation, etc. Shipping by premium air may be faster than other methods but costs more, and shipping by ocean transportation costs much less than premium air, but takes substantially longer.

Thus, the following are some example ways for handling incoming orders: fulfill directly from the on-hand inventory of product or components (no lead time); fulfill from in-transit inventory (some lead time depending on where the shipment is); order a shipment from a supplier via fast transportation mode such as premium air transportation (short lead time, for example, 3-5 days, but with substantially high transportation cost); order a shipment from a supplier via slower transportation mode such as ocean freight (long lead time, for example, 5 weeks, however, less costly than premium air shipment).

The decision on which fulfillment alternatives to use depends on many factors such as requested ship date, service level agreement (SLA) for various customers, realized order/demand forecast, order backlog, customer and/or order priority, transportation costs, budget for transportation expense, and inventory levels or positions in the supply pipeline, that is, inventory on-hand, in-transit or on-order. To efficiently and profitably fulfill the orders, an optimal decision that considers and balances many factors need to be made. However, current methodologies do not provide practical and useful solution to the problem. For instance, standard inventory policies such as reorder point policy, which determines when to place an order for replenishing current inventory, and (s, S) policy, where s represents the inventory position which triggers re-ordering, and S represents target inventory which should be reached as a result of the re-ordering, do not consider multiple transportation modes. In general, no existing decision support system makes inventory replenishment decision and transportation decision jointly by minimizing the overall cost of both decisions. No standard industry practice is reported for joint inventory and transportation decision. Rather, the fulfillment decision is typically made by simple ad-hoc, business rules.

Recent research described in Sethi, Yan, and Zhang, "Peeling Layers of an Onion: Periodic Review Inventory Model with Multiple Delivery Modes and Forecast Updates," Journal of Optimization Theory and Applications, Vol. 108, pp. 253-281, 2001 ("Sethi et al."); Zhang, "Ordering policies for an inventory system with three supply modes," Naval Research Logistics, Vol. 43, No. 5, pp. 691-708, 1996 ("Zhang"); and Scheller-Wolf and Tayur, "A Markovian Dual-Source Production-Inventory Model with Order Bands," GSIA Working Paper No. 1998-E200, Carnegie Mellon University, 1998 ("Scheller-Wolf et al."), extended the standard model in the literature by allowing multiple delivery modes. However, the solution methods proposed in Sethi et al. and Zhang are based on periodic planning models with assumptions that the transportation lead times must be consecutive. The decision rules derived from the existing methods typically deal with stationary demand only. They do not take into account the different demand priorities of orders. Furthermore, inventory decisions in Scheller-Wolf et al. are made based on the inventory position only without analyzing the pipeline inventory information at each stage of the supply chain.

BRIEF SUMMARY OF THE INVENTION

A system and method for optimizing order fulfillment by considering multiple supply modes are provided. The method in one aspect may comprise planning supply of inventory. Planning supply of inventory comprises at least, forecasting demand, estimating accuracy of said forecasted demand, and establishing reorder point policy based at least on said forecasted demand and its accuracy and a plurality of supply transportation modes.

A system for optimizing order fulfillment by considering multiple supply modes, in one aspect, may comprise a planning process module operable to at least forecast demand, estimate accuracy of said forecasted demand, and establish reorder point policy based at least on said accuracy of said forecasted demand and a plurality of supply transportation modes, to plan supply of inventory. An order execution module is operable to run concurrently with said planning process module, and further operable to fill one or more orders received from a customer using said supply of inventory.

The planning process module and the order execution module may be software, hardware or circuit, firmware, or like and may be run on or with a processor such as a central processing unit (CPU) or core on a computer system.

A program storage device readable by a machine, tangibly embodying a program of instructions executable by the machine to perform a method of optimizing order fulfillment by considering multiple supply modes may be also provided.

Further features as well as the structure and operation of various embodiments are described in detail below with reference to the accompanying drawings. In the drawings, like reference numbers indicate identical or functionally similar elements.

DETAILED DESCRIPTION

The system and method are provided that fulfill orders while maximizing the revenue generated by fulfilling customer orders and/or minimizing the overall cost such as inventory cost and transportation cost subject to one or more service level constraints. The system and method may consider one or more of the following factors: Customer Requested Ship Date; Customer (order) priority; Service Level Agreement (SLA) for various customers; Transportation costs (for various transportation modes); Budget for transportation expense; Realized orders/demand forecast, order backlog; Inventory positions (e.g., on-hand, in-transit and on-order minus the backorders).

The system and method may maximize revenue of said fulfillment decision; maximize profitability of said fulfillment decision; minimize liability costs for under-utilizing said inventory; minimize penalty costs for violating desired customer services levels; and minimize penalty costs for deviating from desired priorities of order fulfillment of customer orders.

Figure 1:
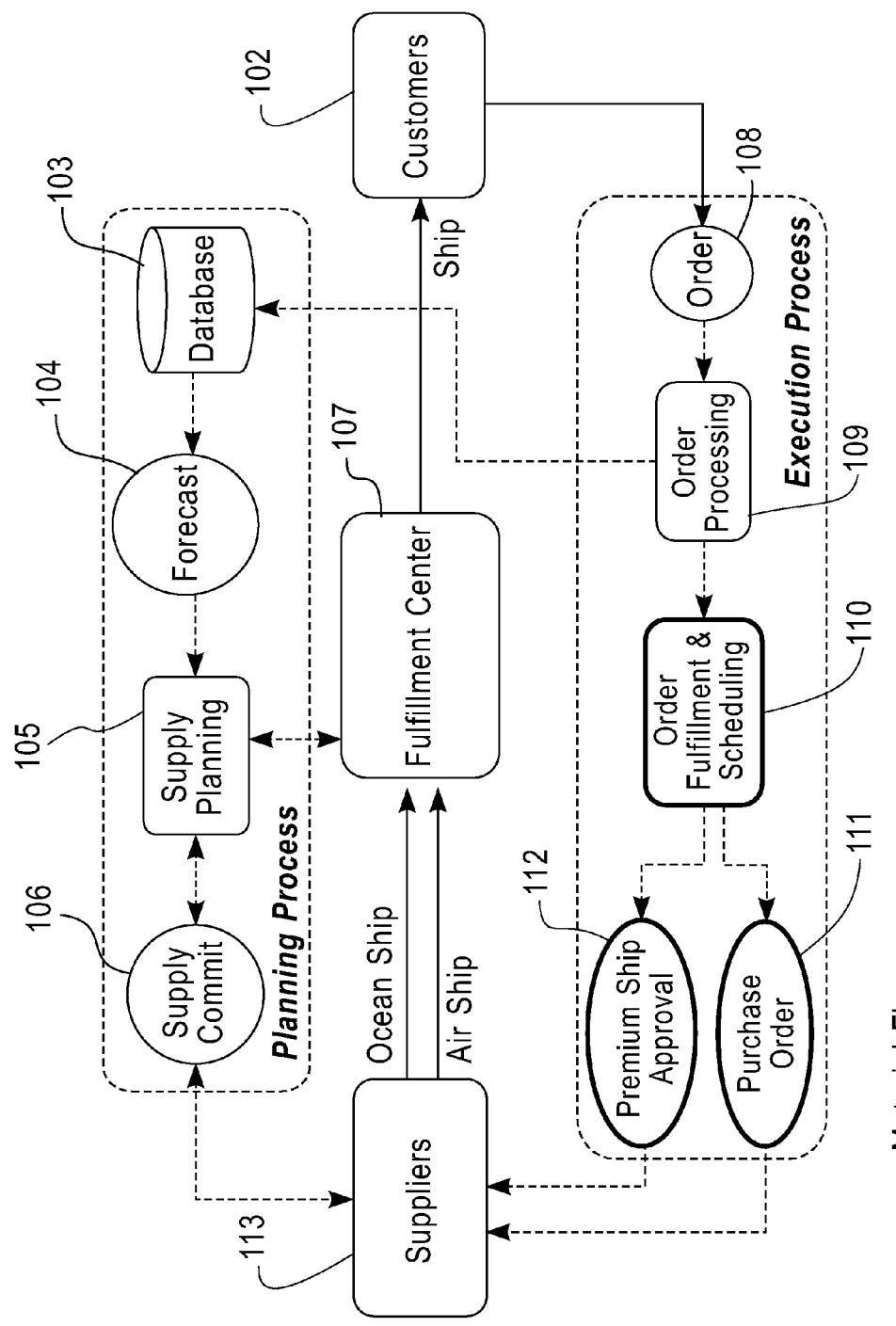
FIG. 1 illustrates a process flow in one embodiment of the present disclosure for optimizing order fulfillment.

FIG. 1 illustrates functional components of a system in one embodiment of the present disclosure for optimizing order fulfillment. A supply chain operation may comprise two sub-processes: planning and execution. The planning process includes demand forecasting (104) which may be based on historical order data (103) and other considerations, and supply planning (105) that creates a supply commitment (106) from components suppliers (113). Briefly, demand forecasting refers to estimating future customer orders or demands. The execution process, in one embodiment, includes order processing (109), executed for instance, after orders (108) are received from customers (102). Functional module shown at (110) handles the order fulfillment and scheduling according to the method and system of the present disclosure in one embodiment.

Figure 2:
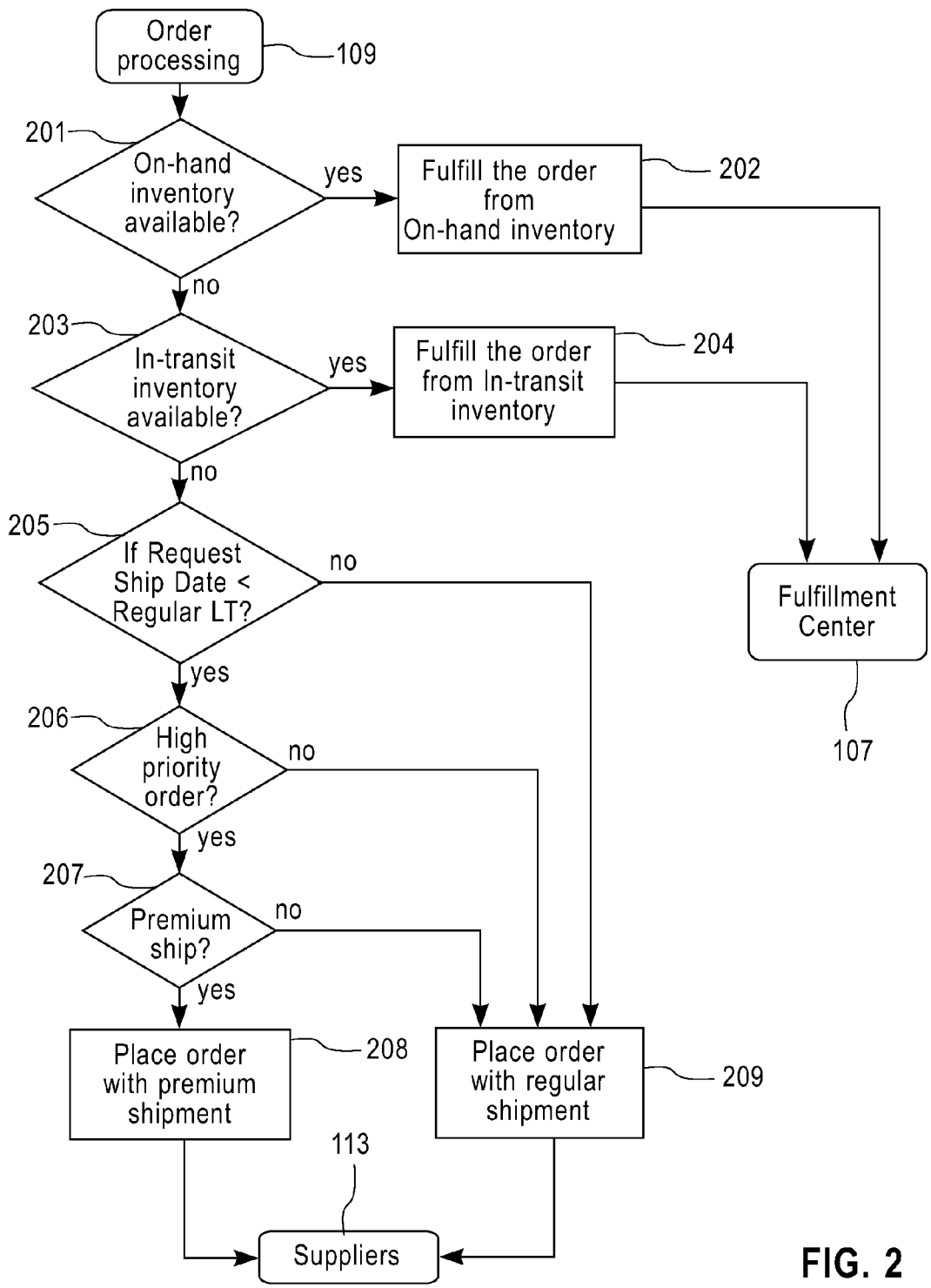
FIG. 2 is a flow diagram illustrating a method in one embodiment for the order fulfillment and scheduling process of the present disclosure.

The planning process may be a periodical process, for example a biweekly process, while the execution process may be a continuous process. For example, the execution may be a continuous or daily process since orders may be received continuously and processed either continuously or daily. Planning may be performed periodically, for instance, once every week or every two weeks, based on the most up-to-date information at the time. The two processes may synchronize periodically, for example, every two weeks. Between two planning cycles, the supply or production plan may be fixed temporarily. The functional details of module (110) in one embodiment are shown in FIG. 2. The outputs of module (110) may include the purchase orders (111) sent by the fulfillment center (107) to the suppliers (113) and the premium ship approvals (112), which authorize the use of air shipments.

FIG. 2 is a flow diagram that illustrates a method in one embodiment for the order fulfillment and scheduling module (110 in FIG. 1). The inventory level (or on-hand inventory level) in this disclosure refers to the amount of physical inventory available for fulfilling customer demand immediately at a given inventory stocking location. The inventory position is the on-hand inventory plus the in-transit inventory minus backorders. In-transit inventory refers to the amount of inventory that has been ordered but has not arrived. A backorder is the portion of demand that is not fulfilled immediately because the on-hand inventory is out of stock. After the order is processed at 109 to verify and confirm the various attributes associated with the order including, for example, the requested ship date, the desired service level, the order priority, etc., it is determined whether there is sufficient inventory available on-hand to fulfill the order at step 201. If inventory is available on-hand, the order is fulfilled from the on-hand inventory at step 202. Otherwise, it is checked at step 203 to determine if there is sufficient inventory available in transit (being shipped to the fulfillment center from supplier). If the in-transit inventory is available, the order is fulfilled from in-transit inventory at step 204. If not, a shipment order has to be placed to order supply from a supplier. In this situation, an optimal order fulfillment decision is made by taking into account the requested ship date at step 205 and the priority of the order at step 206, and by considering available multiple supply transportation modes at step 207.

Thus, in one embodiment of the method of the present disclosure, it is checked at step 205 to determine whether the requested ship date is less than the lead-time (LT) of regular shipment, that is, whether there is enough time before the requested ship date for the shipment to arrive. A regular shipment refers to a standard, normal or usual shipment route taken for shipments of supplies. A greater lead-time compared to the requested ship date implies that the customer will not be able to receive the supplies within the requested time. If at step 205, it is determined that the requested ship date is less than the regular lead-time for shipment, at step 206, it is determined whether the order is of high priority. Whether an order is of high priority may have been set previously using some criteria or threshold. The customer also may set the priority when placing the order. At step 206, if it is determined that the order is of high priority, then at step 207 it is determined whether premium shipping is available and can be approved. A premium shipping refers to transportation method that is faster or takes less time than the regular shipping. If a premium ship order is needed and approved, then the order will be placed at step 208 using premium shipping method (e.g., air shipment). Otherwise regular order will be placed, for example, using ocean or surface (ground) transportation method at step 209. In one embodiment, this process may be applied to every order that is received by the fulfillment center.

In one embodiment, at step 205, if it is determined that the requested ship date is not less than the LT of regular shipment, that is, a normal or usual shipment route, the order may be placed through regular shipment as shown at step 209. Likewise, at step 206, if it is determined that the order does not have high priority, the order may be placed through the regular shipment at step 209. Also at step 208, if there was no premium method of shipping available or such method of shipping has not been approved, the order may be placed through the regular shipment at step 209.

Figure 3:
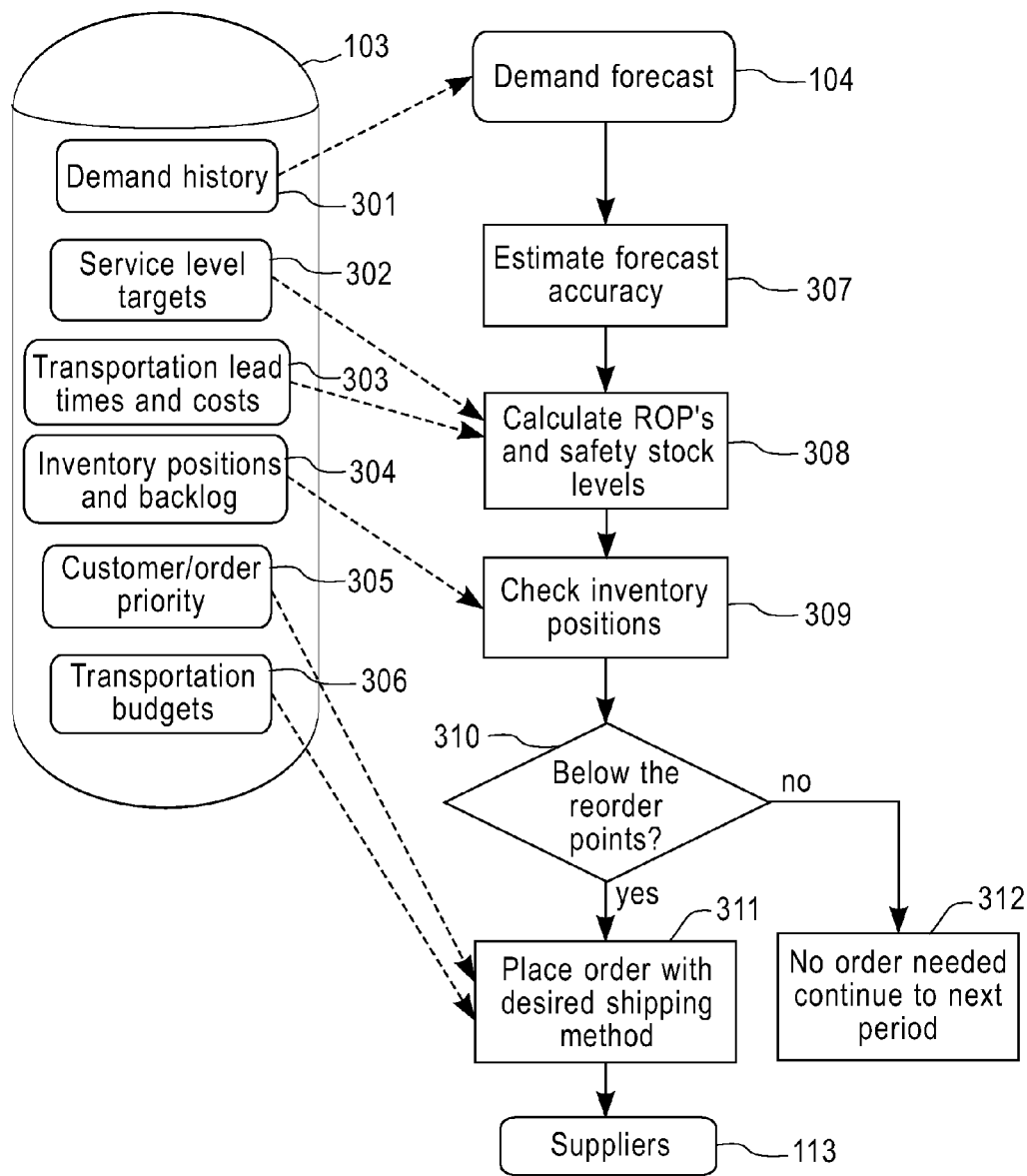
FIG. 3 is a flow diagram illustrating a method in one embodiment for the supply planning and inventory optimization of the present disclosure.

FIG. 3 is a flow diagram illustrating a method in one embodiment for the supply planning and inventory optimization of the present disclosure. A demand/supply planning process may be established in place, and for example at the same time the execution process is in progress, the demand/supply planning process may monitor and forecast demand (demand forecast (104)). Monitoring and forecasting demand (104) may include analyzing historical order data (103) and other considerations. The demand/supply planning process further estimates and updates the forecast accuracy at step 307 based on the analysis and/or demand history (301). One preferred operational policy for inventory control in this embodiment is so-called reorder point policy or base-stock policy, which uses an established reorder point (ROP) as a threshold for determining whether an order to the supplier should be placed. The ROP may include two quantities. One quantity is the expected total demand within the transportation lead-time. The other is the so-called safety stock which is the amount of additional inventory required to cover the expected demand variability within the transportation lead-time for a given service level target. Briefly, service level target is a desired level of service to be achieved for a customer. Such service level target may have been agreed upon between the vendor and the customer, for instance, via service level agreements. In another aspect, service level target may a based on a company policy for meeting customer satisfaction, etc. Thus, at step 308, ROPs and safety stock levels are updated using parameters or data such as the service level targets (302) and transportation lead-times and costs (303). At step 309, inventory positions are checked using inventory positions and backlog data (304). If the inventory levels (or inventory positions) are found at step 310 to be below the optimal reorder points, at step 311, new replenishment orders using either regular or premium transportation mode or combination of the two modes or any other transportation modes as determined for example using customer/order priority data (305) and transportation budget data (306) are established at step 311 to bring the inventory to the desired levels. If at step 310 it is determined that the inventory levels are not below the optimal reorder points, at step 312 a decision is made that no order is needed at this time.

The determination of the reorder points involved in step 308 may comprise multiple computational steps according to the method and system of the present disclosure. The computational steps are described below in detail.

Consider an example of a discrete time, single product, periodic review inventory system. The dynamics of the system contains two parts: the material flows and the information flows. The inbound material flows can come from different supply sources (as a simple example, two supply sources—fast and slow), and the outbound material flows to the customers. The information flows include the demand forecast, and the realized customer demand. At the beginning of each period, the forecast of the demand or the demand forecast is updated. The customer demand materializes or realizes at the end of the period. When the realized customer demand occurs at the end of the period, the customer is satisfied if there is sufficient available inventory, and the excess is carried over to the next period. Otherwise, the customer demand is partially satisfied to the extent of available inventory and the unsatisfied demand is fully backlogged.

The decision variables associated with determination of recorder points (ROPs) are the quantities ordered from the fast and slow sources at the beginning of each period. The ordering decisions are made based on the current inventory position and the current (updated) demand information.

The following notation is introduced in order to formulate the model of the present disclosure in one embodiment:
- k index of time period (k=1, ..., N where N is the number of periods);
- c demand class (without loss of generality, let c=1, 2);
- m transportation mode (without loss of generality, let m=1, 2);
- $O_k^m$ order quantity in period k, and transportation mode m;
- $O_{1,k}^m$ accumulative order quantity of mode m from periods 1 to k;
- $l_m$ order lead time with transportation mode m, $l_1 < l_2$
- $C_k^m$ unit cost of the order with transportation mode m, $C_k^1 > C_k^2$;
- $d_k^c$ demand (a random variable) of class c in period k;
- $\mu_k^c$ the mean of $d_k^c$;
- $\sigma_k^c$ the standard deviation of $d_k^c$;
- $d_{1,k}^c$ accumulative demand of class c from periods 1 to k;
- $\mu_{k,k+lc}^c$ the mean of $d_{1,k}^c$;
- $\sigma_{k,k+lc}^c$ the standard deviation of $d_{1,k}^c$;
- $\alpha^c$ service level for demand class c, $\alpha^1 > \alpha^2$ (we assume the order-to-ship lead time is a constant regardless of the demand class);
- $x_k$ on-hand inventory level at the beginning of period k, and $x_k^- = -\min(x_k, 0)$ and $x_k^+ = \max(x_k, 0)$;
- $y_k^1$ on-hand and incoming inventory that will become available by period $k+l_1$;
- $y_k^2$ inventory position (=on-hand+in-transit+on-order−backlog) at period k;
- $h_k$ inventory holding cost;
- $b_k$ backlog cost.

In one embodiment of the present disclosure, in order to determine the reorder points shown at 308, the forecast for future demand and the estimated accuracy of the forecast need to be obtained. In one aspect, the demand forecast may be obtained by analyzing the historical demand forecasts along with the corresponding actual demands. Statistical methods for estimating probability distributions, i.e. mean and standard deviation, for instance, are found in the literature and commercial software, and may be utilized to obtain and update the forecast for future demand.

Forecast accuracy may be estimated at step 307, for instance, using the following definition or formula. Other methods may be employed for determining the forecast accuracy. For a given time period t, consider a family of N products. Let $y_1, y_2, \ldots, y_N$ denote the demand (orders) in units for the N products. These are the actual values and $y_j \geq 0$ for all j. Let $f_1, f_2, \ldots, f_N$ be any set of forecasts made for the N product demands at time prior to t. Consequently, $e_1 = |y_1 - f_1|, e_2 = |y_2 - f_2|, \ldots, e_N = |y_N - f_N|$ are the forecast errors. Note that the time period is fixed, so the subscripts represent different products, not time periods. The forecast error is given by $$E = \sum_{j=1}^{N} e_j = \sum_{j=1}^{N} |y_j - f_j|.$$

The corresponding forecast accuracy is defined as $$A = \begin{cases} 1 - E \Big/ \sum_{j=1}^{N} y_j & \text{if } E \Big/ \sum_{j=1}^{N} y_j < 1 \\ 0 & \text{otherwise} \end{cases}$$

The computation of step 308 may involve the following steps. For the convenience of analysis, it is assumed that the random demand $d_k^c$ follows a normal distribution with the mean being the forecast and the standard deviation being the forecast error for the given demand class.

We now define the inventory balance equations in one embodiments as follows.

$$\begin{cases} x_{k+1} = x_k + O_{k-l_1}^1 + O_{k-l_2}^2 - d_k^1 - d_k^2 \\ y_{k+1}^1 = y_k^1 + O_k^1 + O_{k-l_2+l_1}^2 - d_k^1 - d_k^2 \\ y_{k+1}^2 = y_k^2 + O_k^1 + O_k^2 - d_k^1 - d_k^2 \end{cases},$$

$$k = 1, \ldots, N$$

Here it is assumed that the demand not met immediately from inventory is backlogged and fulfilled when inventory becomes available.

The objective of the problem is to minimize the expected total cost incurred including ordering/transportation costs of the orders (shown at 303) and other cost information including inventory holding costs, and backlog costs, i.e., $$\min E\left[\sum_{k=1}^{N}(C_k^1 \cdot O_k^1 + C_k^2 \cdot O_k^2 + h_k \cdot x_k^+ + b_k \cdot x_k^-)\right]$$

subject to:

$$\begin{cases} P(d_{1,k}^1 > O_{1,k}^1 + O_{1,k}^2) \le -\alpha^1, \\ P(d_{1,k}^1 + d_{1,k}^2 > O_{1,k}^1 + O_{1,k}^2) \le 1 - \alpha^2, \end{cases}$$

(service level constraints shown at 302).

Here E represents expected value calculation for the objective function shown above. The objective function uses the forecast accuracy (in terms of mean and standard deviation for normally distributed random variable) that is computed at 307, and P ( ) is the conditional probability of satisfying service level constraints. P is estimated using forecast error, which is equivalent of forecast accuracy, A, computed above. Note that there can be other constraints like transportation budget limits (at 306), etc., which could be added to the set of constraints shown above, for example, when necessary or desired.

Given the setting of this problem, the optimal solution can be expressed as $$\begin{cases} O_k^1 = O_k^1(x_k, y_k^1, y_k^2 \mid d_k^1, d_k^2), \\ O_k^2 = O_k^2(x_k, y_k^1, y_k^2, O_k^1 \mid d_k^1, d_k^2). \end{cases}$$

In this example, the solution is provided in the form of order quantities of various transportation modes. In the above formulation for the optimization problem, the order with the fast transportation mode will be determined first followed by the decision for the order with the slow transportation mode.

The method of the present disclosure generalizes the standard reorder point policy to the following threshold-type inventory policy by incorporating the special structure of the new model.

Specifically, let
$R_k^m$ be the reorder point for $O_k^m$, m=1,2.
Therefore, we have $$O_k^m = \begin{cases} R_k^m - y_k^m, & y_k^m < R_k^m \\ 0, & o.w. \end{cases}$$

Such a solution means that fast orders will be placed based on the inventory available to satisfy the demand within the time-window specified by the order-to-ship lead time. The slow order will be placed based on the current inventory position, which is consistent with the standard reorder point inventory policy. Furthermore, the reorder points $R_k^m$ should also reflect the demand that is being satisfied in terms of the quantity and the demand class.

The exact computation of $R_k^m$ includes solving a set of dynamic programming equations. A simplified computation method is used for one embodiment of this disclosure. An example of such computation method may include a heuristic approach using the following formulae to compute the desired reorder points (at 308) for inventory buffers associated with given supply modes (fast shipment and slow shipment etc.):

$$\begin{cases} R_k^1 = \mu_{k,k+l1}^1 + k_f^1 \sigma_{k,k+l1}^1 \\ R_k^2 = \mu_{k,k+l1}^1 + \mu_{k,k+l2}^2 + k_f^2((\sigma_{k,k+l1}^1)^2 + (\sigma_{k,k+l2}^2)^2)^{1/2} \end{cases}$$

where $k_f^m$ is the safety factor associated with supply mode m given by $\Phi_m^{-1}(\alpha^m)$). Here $\Phi_1$ is the distribution of $d_{k+l1}^1$, and $\Phi_2$ is the joint distribution of $d_{k+l1}^1 + d_{k+l2}^2$. The corresponding safety stock levels for $R_k^1$ and $R_k^2$ are given (computed at 308) by $k_f^1 \sigma_{k,k+l1}^1$ and $k_f^2((\sigma_{k,k+l1}^1)^2 + (\sigma_{k,k+l2}^2)^2)^{1/2}$ respectively.

The interpretation of the heuristic is that the slow order is used to cover the expected demand from both high and low priority classes (305). The fast order is primarily used when there is not enough inventory to fulfill the incoming orders from the high priority demand class within the order-to-ship time window. At step 310, optimal decision is made on whether a replenishment order should be placed and what transportation mode should be used for the order. This decision may be repeated every period with updated demand forecasts and inventory data.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer and/or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer implemented method for optimizing order fulfillment by considering multiple supply modes, comprising:

planning supply of inventory, by a processor, said step of planning supply of inventory comprising at least, forecasting demand, estimating accuracy of said forecasted demand, and establishing reorder point policy based at least on said accuracy of said forecasted demand and a plurality of supply transportation modes, the reorder point policy being a threshold for determining whether an order to a supplier should be placed and the plurality of supply transportation modes including transportation modes with different speeds of transportation, the planning further including minimizing expected total cost incurred including order and transportation costs of the order, and inventory holding cost and backlog costs for meeting a service level target, wherein the minimizing determines at least a level of order quantity for each of the plurality of supply transportation modes while satisfying an inventory balance constraint comprising at least demands of different classes associated with different customer order priority and a sum of on-hand inventory and incoming inventory that will become available by a specific period with lead time, wherein the planning provides joint inventory replenishment and transportation decisions that minimize overall cost of both decisions, wherein the planning produces as an output the plurality of supply transportation modes including transportation modes with different speeds of transportation and an order quantity for each of the plurality of supply transportation modes, wherein the reorder point policy with safety stock level is updated using parameters including at least the service level target and transportation lead-time and cost, wherein an inventory level of the inventory is checked using inventory position and backlog data, and in response to determining that the inventory level is below the reorder point policy, new replenishment orders are placed for delivery via at least one of the plurality of supply transportation modes as determined using at least said different customer order priority and transportation budget data, to replenish the inventory to a desired level.

2. The method of claim 1, wherein said step of establishing reorder point policy includes establishing reorder point policy based at least on said accuracy of said forecasted demand, a plurality of supply transportation modes, and the service level target, and computing $$\begin{cases} R_k^1 = \mu_{k,k+l1}^1 + k_f^1 \sigma_{k,k+l1}^1 \\ R_k^2 = \mu_{k,k+l1}^1 + \mu_{k,k+l2}^2 + k_f^2 \left( (\sigma_{k,k+l1}^1)^2 + (\sigma_{k,k+l2}^2)^2 \right)^{1/2} \end{cases}$$

wherein
$R_k^1$ represents a reorder point associated with transportation mode 1 at period k;
$\mu_{k,k+l1}^1$ represents a mean demand associated with demand class 1 between period k and k+order lead time 1 of transportation mode 1;
$k_f^1$ represents a safety stock level associated with a supply of transportation mode 1 given by distribution of $d_{k+l1}^1$;
$\sigma_{k,k+l1}^1$ represents a standard deviation associated with $\mu_{k,k+l1}^1$;
$R_k^2$ represents a reorder point associated with transportation mode 2 at period k;
$\mu_{k,k+l2}^2$ represents a mean demand associated with demand class 2 between period k and k+order lead time 1 of transportation mode 2;
$\sigma_{k,k+l2}^2$ represents a standard deviation associated with $\mu_{k,k+l2}^2$;
$k_f^2$ represents a safety stock level associated with supply of transportation mode 2 given by joint distribution of $d_{k+l1}^1 + d_{k+l2}^2$.

3. The method of claim 1, wherein said step of planning supply of inventory further includes:
replenishing current inventory to meet said reorder point policy, wherein the minimizing is performed by solving $$minE\left[\sum_{k=1}^{N}(C_k^1 \cdot O_k^1 + C_k^2 \cdot O_k^2 + h_k \cdot x_k^+ + b_k \cdot x_k^-)\right]$$

wherein,
k index of time period, k=1, ..., N, where N is the number of periods;
$C_k^m$ is a unit cost of the order with transportation mode m, $C_k^1 > C_k^2$;
$O_k^m$ is an order quantity in period k, associated with transportation mode m;
$h_k$ is an inventory holding cost;
$b_k$ is a backlog cost; and
$x_k$ is an on-hand inventory level at beginning of period k, where $x_k^- = -\min(x_k, 0)$ and $x_k^+ = \max(x_k, 0)$,
while satisfying inventory balance constraint comprising $$\begin{cases} x_{k+1} = x_k + O_{k-l1}^1 + O_{k-l2}^2 - d_k^1 - d_k^2 \\ y_{k+1}^1 = y_k^1 + O_k^1 + O_{k-l2+l1}^2 - d_k^1 - d_k^2 \\ y_{k+1}^2 = y_k^2 + O_k^1 + O_k^2 - d_k^1 - d_k^2 \end{cases}$$

wherein,
$y_k^1$ is on-hand and incoming inventory that will become available by period $k+l_1$;
$y_k^2$ represents inventory position at period k.

4. The method of claim 3, wherein said step of replenishing includes:
selecting a shipping mode from a plurality of shipping modes based on transportation budget.

5. The method of claim 3, wherein said step of replenishing includes:
selecting a shipping mode from a plurality of shipping modes based on priority of orders from a customer.

6. The method of claim 1, further including:
receiving one or more orders from a customer;
filling said one or more orders from said supply of inventory.

7. The method of claim 6, wherein said supply of inventory includes on-hand inventory and in-transit inventory.

8. The method of claim 6, wherein if said one or more orders cannot be filled from said supply of inventory, placing orders according to a selected shipping method, said selected shipping method based at least on customer order priority and transportation budget.

9. The method of claim 6, wherein said step of filling one or more orders is performed concurrently with the step of planning supply of inventory.

10. The method of claim 6, wherein said step of filling one or more orders further includes:
checking availability of current inventory to determine whether said one or more orders can be filled from said current inventory, and filling said one or more orders from said current inventory if available;
checking availability of in-transit inventory to determine whether said one or more orders can be filled from said in-transit inventory, and filling said one or more orders from said in-transit inventory if available; and if said one or more orders are not filled from said current inventory or said in-transit inventory, placing an order for said one or more orders using premium shipping based on a plurality of criteria.

11. The method of claim 10, wherein said step of placing an order for said one or more orders using said premium shipping based on a plurality of criteria includes:
determining whether requested ship date associated with said one or more orders is less than lead-time for regular shipment, and if said requested ship date is less than said lead-time for regular shipment, determining priority of said one or more orders and if said priority meets a threshold for being high priority, determining whether premium shipping is approved for said one or more orders, and if approved, placing an order for said one or more orders using said premium shipping.

12. The method of claim 10, wherein said plurality of criteria includes requested ship date, service level agreement (SLA), transportation costs of one or more shipping modes, budget for transportation expense, realized order forecast, realized demand forecast, order backlog, inventory positions, customer priority, or order priority, or combinations thereof.

13. The method of claim 1, wherein said steps of forecasting demand, estimating accuracy of said forecasted demand, and establishing reorder point policy are performed automatically and repeatedly.

14. The method of claim 1, wherein said steps of forecasting demand, estimating accuracy of said forecasted demand, and establishing reorder point policy are performed repeatedly every predetermined period.

15. The method of claim 1, further including:
analyzing historical forecasts and orders to estimate accuracy of the forecasted demand.

16. The method of claim 1, wherein said step of estimating accuracy of said forecasted demand includes using probability distribution.

17. The method of claim 1, wherein said step of establishing reorder point policy includes minimizing an objective function that considers at least expected total cost incurred for ordering, transportation costs of orders, inventory holding costs, and backlog costs, subject to one or more service level constraints and one or more premium transportation budget constraints.

18. A system for optimizing order fulfillment by considering multiple supply modes, comprising:
a processor;
planning process module operable to execute on the processor and to at least forecast demand, estimate accuracy of said forecasted demand, and establish reorder point policy based at least on said accuracy of said forecasted demand and a plurality of supply transportation modes, to plan supply of inventory; and
order execution module operable to run concurrently with said planning process module, and further operable to fill one or more orders received from a customer using said supply of inventory,
the reorder point policy being a threshold for determining whether an order to a supplier should be placed and the plurality of supply transportation modes including transportation modes with different speeds of transportation, the planning further including minimizing expected total cost incurred including order and transportation costs of the order, and inventory holding cost and backlog costs for meeting a service level target, wherein the minimizing determines at least a level of order quantity for each of the plurality of supply transportation modes while satisfying an inventory balance constraint comprising at least demands of different classes associated with different customer order priority and a sum of on-hand inventory and incoming inventory that will become available by a specific period with lead time, wherein the planning provides joint inventory replenishment and transportation decisions that minimize overall cost of both decisions,
wherein the planning process module produces as an output the plurality of supply transportation modes including transportation modes with different speeds of transportation and an order quantity for each of the plurality of supply transportation modes,
wherein the reorder point policy with safety stock level is updated using parameters including at least the service level target and transportation lead-time and cost,
wherein an inventory level of the inventory is checked using inventory position and backlog data, and in response to determining that the inventory level is below the reorder point policy, new replenishment orders are placed for delivery via at least one of the plurality of supply transportation modes as determined using at least said different customer order priority and transportation budget data, to replenish the inventory to a desired level.

19. The system of claim 18, wherein said planning process module establishes reorder point policy based at least on said accuracy of said forecasted demand, a plurality of supply transportation modes, and the service level target, wherein the minimizing is performed by solving $$\min E\left[\sum_{k=1}^{N}(C_k^1 \cdot O_k^1 + C_k^2 \cdot O_k^2 + h_k \cdot x_k^+ + b_k \cdot x_k^-)\right]$$

wherein,
k index of time period, k=1, ..., N, where N is the number of periods;
$C_k^m$ is a unit cost of the order with transportation mode m, $C_k^1 > C_k^2$;
$O_k^m$ is an order quantity in period k, associated with transportation mode m;
$h_k$ is an inventory holding cost;
$b_k$ is a backlog cost; and
$x_k$ is an on-hand inventory level at beginning of period k, where $x_k^- = -\min(x_k, 0)$ and $x_k^+ = \max(x_k, 0)$,
while satisfying inventory balance constraint comprising $$\begin{cases} x_{k+1} = x_k + O_{k-l1}^1 + O_{k-l2}^2 - d_k^1 - d_k^2 \\ y_{k+1}^1 = y_k^1 + O_k^1 + O_{k-l2+l1}^2 - d_k^1 - d_k^2 \\ y_{k+1}^2 = y_k^2 + O_k^1 + O_k^2 - d_k^1 - d_k^2 \end{cases}$$

wherein,
$y_k^1$ represents sum of on-hand inventory and incoming inventory that will become available by period $k+l_1$, where $l_1$ represents lead time;
$y_k^2$ represents inventory position at period k.

20. A program storage device readable by a machine, tangibly embodying a program of instructions executable by the machine to perform a method of optimizing order fulfillment by considering multiple supply modes, comprising:
planning supply of inventory, said step of planning supply of inventory comprising at least, forecasting demand, estimating accuracy of said forecasted demand, and establishing reorder point policy based at least on said accuracy of said forecasted demand and a plurality of supply transportation modes, the reorder point policy being a threshold for determining whether an order to a supplier should be placed and the plurality of supply transportation modes including transportation modes with different speeds of transportation, the planning further including minimizing expected total cost incurred including order and transportation costs of the order and inventory holding cost and backlog costs by solving $$\min E\left[\sum_{k=1}^{N}(C_k^1 \cdot O_k^1 + C_k^2 \cdot O_k^2 + h_k \cdot x_k^+ + b_k \cdot x_k^-)\right]$$

wherein, k index of time period, k=1, ..., N, where N is the number of periods;

$C_k^m$ is a unit cost of the order with transportation mode m, $C_k^1 > C_k^2$;

$O_k^m$ is an order quantity in period k, associated with transportation mode m;

$h_k$ is an inventory holding cost;

$b_k$ is a backlog cost; and $x_k$ is an on-hand inventory level at beginning of period k, where $x_k^- = -\min(x_k,0)$ and $x_k^+ = \max(x_k,0)$, while satisfying inventory balance constraint comprising $$\begin{cases} x_{k+1} = x_k + O_{k-l1}^1 + O_{k-l2}^2 - d_k^1 - d_k^2 \\ y_{k+1}^1 = y_k^1 + O_k^1 + O_{k-l2+l1}^2 - d_k^1 - d_k^2 \\ y_{k+1}^2 = y_k^2 + O_k^1 + O_k^2 - d_k^1 - d_k^2 \end{cases}$$

wherein, $y_k^1$ represents sum of on-hand inventory and incoming inventory that will become available by period $k+l_1$, where $l_1$ represents lead time;

$y_k^2$ represents inventory position at period k, wherein the planning provides joint inventory replenishment and transportation decisions that minimize overall cost of both decisions, the joint inventory replenishment and transportation decisions comprising the plurality of supply transportation modes including transportation modes with different speeds of transportation and an order quantity for each of the plurality of supply transportation modes, wherein the reorder point policy with safety stock level is updated using parameters including at least the service level target and transportation lead-time and cost, wherein an inventory level of the inventory is checked using inventory position and backlog data, and in response to determining that the inventory level is below the reorder point policy, new replenishment orders are placed for deliver via at least one of the plurality of supply transportation modes as determined using at least said different customer order priority and transportation budget data, to replenish the inventory to a desired level.

* * * * *